United States Patent
Malik et al.

(10) Patent No.: US 7,136,858 B2
(45) Date of Patent: Nov. 14, 2006

(54) NETWORK UPDATE MANAGER

(75) Inventors: Dale W. Malik, Dunwoody, GA (US); Lee G. Friedman, Alpharetta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 541 days.

(21) Appl. No.: 10/211,763

(22) Filed: Aug. 1, 2002

(65) Prior Publication Data
US 2003/0220945 A1    Nov. 27, 2003

Related U.S. Application Data

(60) Provisional application No. 60/382,106, filed on May 21, 2002.

(51) Int. Cl.
*G06F 17/13* (2006.01)
(52) U.S. Cl. ............................................. 707/10; 707/8
(58) Field of Classification Search .............. 707/1–10, 707/100–104.1, 200–206
See application file for complete search history.

(56) References Cited

U.S. PATENT DOCUMENTS

| | | | |
|---|---|---|---|
| 5,926,816 A * | 7/1999 | Bauer et al. ................. | 707/8 |
| 6,405,035 B1 | 6/2002 | Singh ......................... | 455/414 |
| 6,415,318 B1 | 7/2002 | Aggarwal et al. .......... | 709/206 |
| 6,604,133 B1 | 8/2003 | Aggarwal et al. .......... | 709/206 |
| 6,677,968 B1 * | 1/2004 | Appelman .................. | 715/853 |
| 2003/0018726 A1 * | 1/2003 | Low et al. .................. | 709/206 |

OTHER PUBLICATIONS

Patent Application entitled: Instant Messaging Architecture and System for Interoperability and Presence Management; filed Apr. 29, 2002; U.S. Appl. No. 10/135,929.

* cited by examiner

*Primary Examiner*—Jeffrey Gaffin
*Assistant Examiner*—Yicun Wu
(74) *Attorney, Agent, or Firm*—Thomas, Kayden, Horstemeyer & Risley, LLP

(57) ABSTRACT

Network resource management systems are provided. A representative network update manager includes an updater coupled to a persistent database and to an administrative application residing on an application server and a memory operable to store a plurality of delayed updates. The network update manager is preferably operable to receive at least one update from the administrative application and subsequently update the persistent database. Methods and other systems for network resource management are also provided.

17 Claims, 9 Drawing Sheets

NETWORK UPDATE MANAGER

CROSS-REFERENCE TO RELATED APPLICATION

This application claims priority to copending U.S. provisional application entitled, "INTEGRATION OF INSTANT MESSAGING AND COMPUTER OPERATING SYSTEMS," having Ser. No. 60/382,106, filed May 21, 2002, which is entirely incorporated herein by reference.

FIELD OF THE INVENTION

The present invention is generally related to telecommunications and more particularly to services provided to clients via instant messaging applications.

DESCRIPTION OF THE RELATED ART

The development of the internet has driven vast technological developments, particularly in the areas of networking hardware and software. Networking hardware developments have enabled networks to transfer large files in fractions of a second. Software developments, such as the world-wide-web (web) and e-mail, have facilitated communications over these networks that have allowed users to remain in almost constant contact with work. These types of communications have become of utmost importance in the business setting, where response time has become a key survival factor for many companies. Other networking software has allowed users to access and run applications from remote locations, thus enabling a businessperson to remain more productive, even on a business trip.

Moreover, the internet has changed the way people communicate. E-mail has become the dominant means of communications in many settings, being preferred over traditional mail, and even telephones in some cases. Almost instantaneous communication with little charge has driven much of the popularity of e-mail. Once used only in university and military settings, e-mail has gained widespread public acceptance.

In a world economy based largely upon communication, the relative speed of e-mail in comparison to traditional mail is often not fast enough or as effective. Demand for faster access to more information has resulted in the development of a number of instant messaging (IM) services. IM brings presence information into the communications arena, and it allows users to have real-time chat sessions with other users who are present on the system. The real-time nature of IM has led to quick acceptance by many in the business community of IM as an invaluable tool for communication. However, current IM systems often have administration and management problems.

Therefore, there is a need for systems and method that address these and/or other perceived shortcomings of the prior art.

SUMMARY OF THE INVENTION

One embodiment of the present invention provides systems and methods for a network update manager. A representative system, among others, includes an updater coupled to a persistent database and to an administrative application tool residing on an application server and a memory operable to store a plurality of delayed updates. The network update manager is operable to receive at least one update from the administrative application tool, and either update the persistent database through the updater or store the at least one update in memory for delayed updating in response to a network presence status of a user associated with an update. Other embodiments include receiving and storing updates until updates are requested without evaluating presence status.

A method for updating a database preferably includes: receiving an update; checking whether a profile associated with at least part of the update in a persistent database is currently being used; updating the persistent database in response to the profile being unused; and delaying at least part of the update to the persistent database in response to the profile being used.

Other systems, methods, features, and advantages of the present invention will be or become apparent to one with skill in the art upon examination of the following drawings and detailed description. It is intended that all such additional systems, methods, features, and advantages included within this description and be within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the present invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1A:
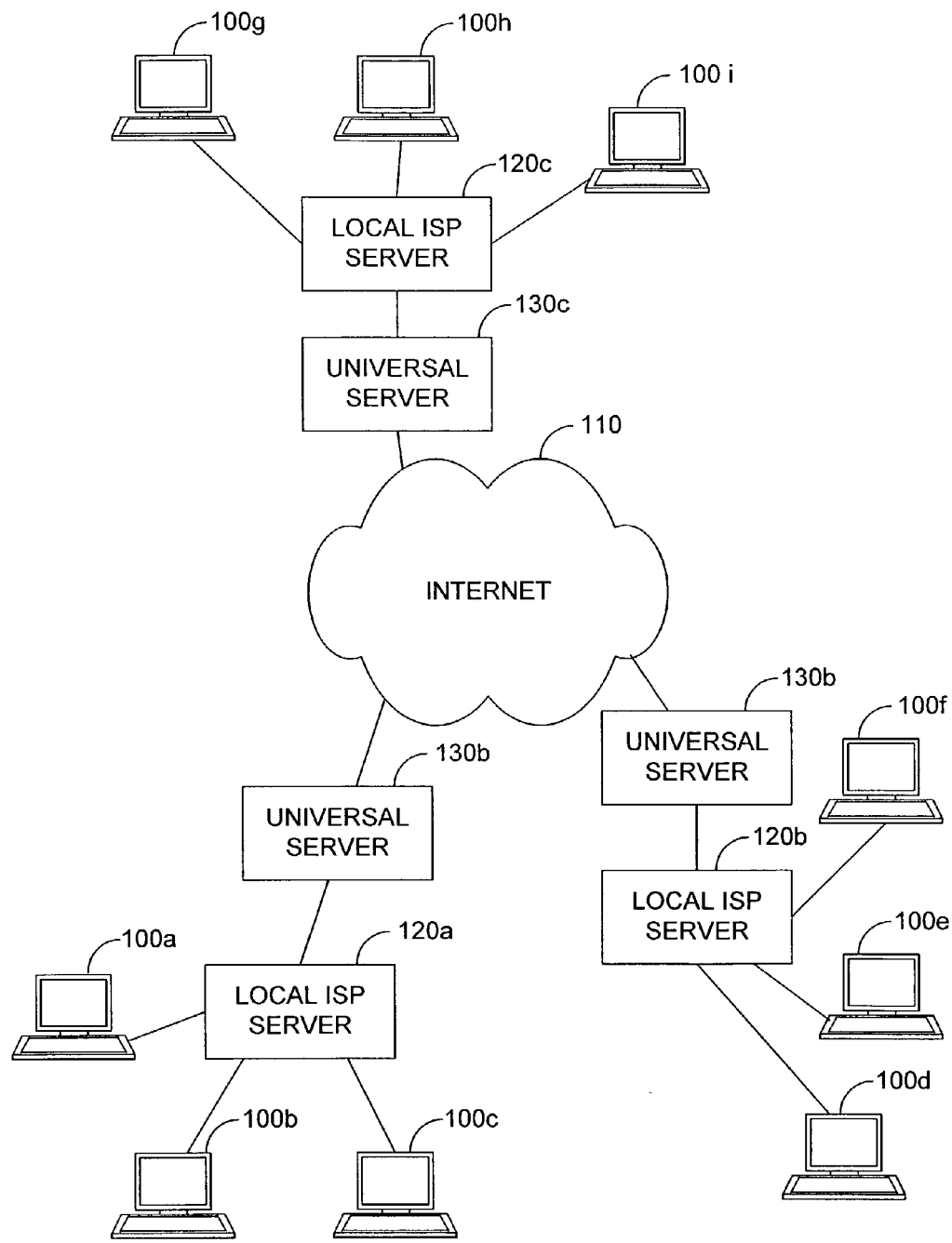
FIG. 1A is a block diagram illustrating an interoperability architecture for instant messaging used in one embodiment, among others, of the present invention.

Referring now to FIG. 1A, shown is a block diagram illustrating an interoperability architecture for instant messaging used in one embodiment, among others, of the present invention. Each of a plurality of remote clients 100a–i access a network 110 through a local internet service provider (ISP) server 120a–c. The local ISP 120a–c can offer network 110 access through a myriad of connection types, including a digital subscriber line (DSL) service, an integrated services digital network (ISDN) service, an analog dial-up service, ethernet, T-1, or any other service for transmitting data through a network 110. Universal servers 130a–c are located between the internet and each of the local ISP servers 120a–c. These universal servers 130a–c provide interoperability between a plurality of proprietary instant messaging clients 100a–i. Of course, the scope of the presentation includes networks other than those with universal servers or instant messaging.

Figure 1B:
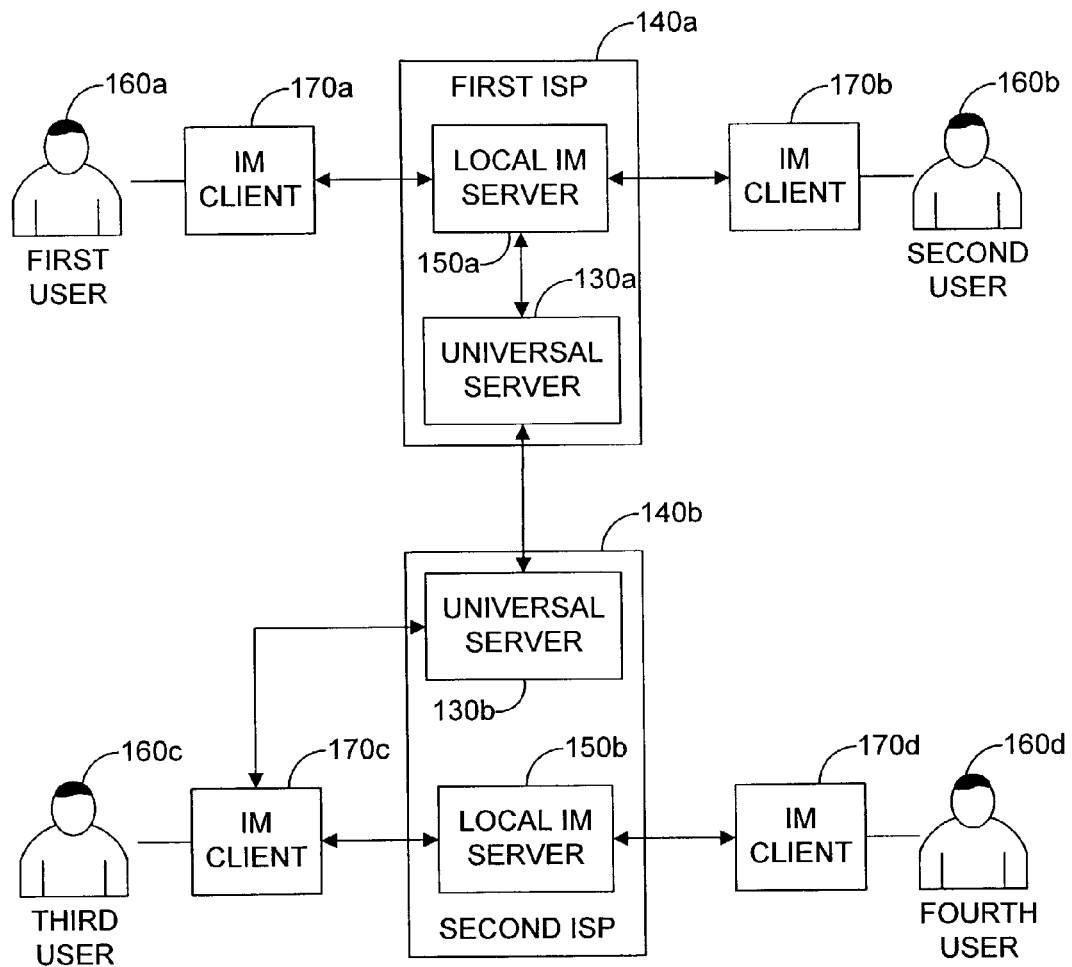
FIG. 1B is a block diagram illustrating an alternative embodiment, among others of an interoperability architecture for instant messaging used in one embodiment, among others, of the present invention.

Referring now to FIG. 1B, shown is an illustration of an alternative embodiment, among others, of a universal architecture. Greater detail regarding this interoperability architecture may be found in U.S. patent application Ser. No. 10/135,929, entitled "Instant Messaging Architecture and System for Interoperability and Presence Management," which is hereby incorporated by reference. The universal architecture uses a universal protocol, such as the extensible markup language (XML) protocol to allow users of different ISPs 140a, 140b that use proprietary protocols to communicate with one another. Universal servers 130a, 130b located at each of the ISPs 140a, 140b are the key feature of the universal architecture. FIG. 1B illustrates two separate ISP networks 140a, 140b. Because the two networks are identical, the discussion of the universal architecture for purposes of this application is limited to the ISP 140a, 140b. Additionally, the discussion of the ISP 140a, 140b will be limited to the components that provide the universal service.

The ISP 140a contains two servers: a local IM server 150a and the universal server 130a. The local IM server 150a provides the standard IM function for the ISP 140a. The universal server 130a provides the universal function that allows the first user 160a, who is registered with the first ISP 140a, to communicate with a second user 160b registered with the second ISP 140b. The first ISP 140a provides connections to a plurality of clients 170a, 1170b, which allows users 160a, 160b to access the proprietary IM and universal functions of the ISP 140a. The first ISP 140a is "bimodal," in that it uses both a proprietary and universal format to provide a proprietary IM function that only allows the users who are registered with the ISP 140a to send and receive instant messages. For example, if only one user has registered with the universal server 130a, then the local IM server 150a will transfer instant messages between the first and second users 160a, 160b using the proprietary protocol. However, if both the first and second users 160a, 160b are registered with the universal server 130a, then the first ISP 140a can transfer instant messages between them using the universal protocol. By supporting both formats at the first ISP 140a, users can migrate to the universal format over time. When all users 160a. 160b have migrated the proprietary format can be discontinued.

The universal server 130a removes the restrictions associated with proprietary IM functions associated with the ISP 140a. The universal server 130a uses a universal format, such as XML, or any other suitable format, that allows users 160a, 160b registered with an ISP 140a, such as BellSouth DotNet, to send and receive instant messages from other users 160c, 160d registered with another ISP 140b, such as America Online (AOL).

The user 160a accesses the local IM server 150a of the ISP 140a through the IM client 170a. The IM client 170a typically includes a proprietary software program that is capable of opening communications sockets that allow the IM client to communicate with the local IM server 150a using either the proprietary or universal protocols. The software program is capable of formatting an instant message sent from the IM client 170a to the appropriate format used by the IM function of the ISP 140a. In this manner, the user 170a is capable of communicating with any other user 160b registered with the ISP 140a. However, the local IM server 150a on a first ISP 140a is also connected to a first universal server 130a. The first universal server 130a is in turn, connected to a second universal server 130b on the second ISP 140b via a distributed network, such as the internet. This allows the user 160a to communicate not only with the user 160b who is registered with the first ISP 140a, but also with users 160c who are registered with the second ISP 140b that uses a different proprietary IM protocol to send and receive instant messages within the network of the second ISP 140b.

In order for the first user 160a to be able to send and receive messages with a third user 160c on the second ISP 140b, the IM client 170a must be able to identify the IP address and presence information associated with the third user 160c. The presence information for the third user 160c is stored on the universal server 130a connected to the first ISP 140a. The universal server 130a on the first ISP 140a stores the IP address and presence information for the third user 160c. Therefore, the first user 160a, who is registered with the universal server 130a on the first ISP 140a has access to the IP address and presence information of the third user 160c. The first user 160a will not be able to communicate with a fourth user 160d if the fourth user 160d is not registered with the universal server 130b, but instead is only registered with a local IM server 150b, and as a result, is able to send and receive instant messages using only the proprietary format. Therefore, the user 160d is limited to communicating via instant messages with users of the second ISP 140b, such as the third user 160c.

An advantageous feature of the universal architecture is that it is designed to be easily integrated within existing ISPs 140a, 140b, such as AOL and Microsoft Network (MSN) without disrupting the current IM function of these ISPs 140a, 140b. Each ISP 140a, 140b that adopts the universal architecture requires only a slight modification to the existing network. The ISP 140a, 140b adds an additional server to function as the universal server 130a, 130b and can install a universal application program on the local IM server 150a, 150b and each IM client 170a–d attached to the network. The universal application program that is installed at each IM client 170a–d converts the IM client 170a–d to function as "bimodal." That is, the IM client 170a–d is capable of using the proprietary IM protocol of the ISP 140a, 140b and the universal protocol of the universal architecture. The bimodal nature of the IM client 170a–d allows the universal server 130a, 130b to be implemented into existing ISPs 140a, 140b such as AOL and MSN without disrupting the current proprietary IM functions of those services. This allows the current users 160a–d to continue using the proprietary IM function of their particular ISP 140a, 140b until every user 160a–d can be converted to the universal protocol.

Figure 2:
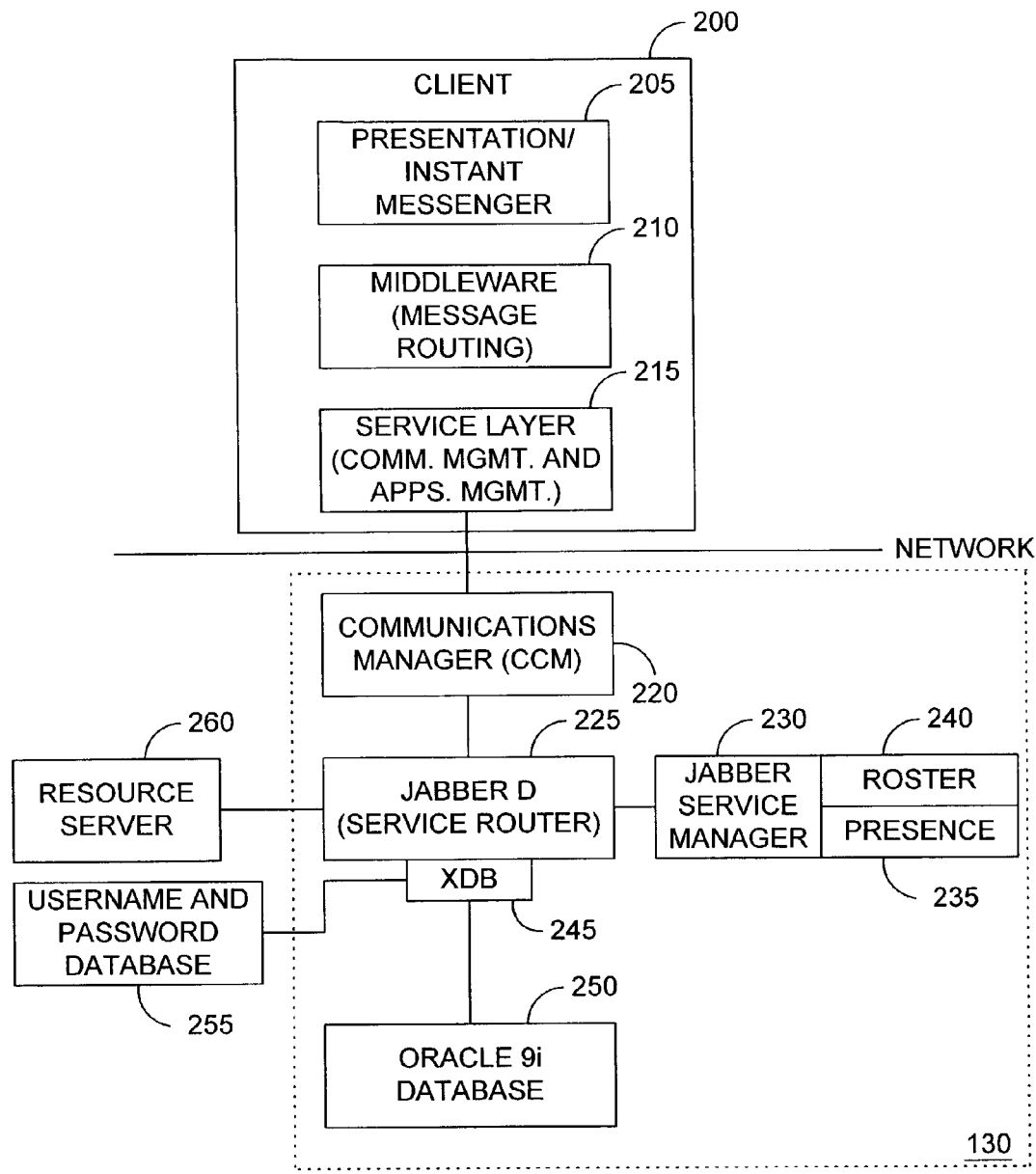
FIG. 2 is a block diagram of the interoperability architecture used in one embodiment, among others, of the present invention.

Referring now to FIG. 2, shown is a block diagram illustrating an embodiment, among others, of the universal server 130 of FIGS. 1A & B, which is used in conjunction with an embodiment, among others, of the present invention.

The client 200 includes at least three layers of functionality in one embodiment, among others, to communicate with the universal server 130. The first layer is the presentation layer 205. The presentation layer 205 includes the logic that is used to present the instant messenger or another application to a user. The second layer is a middleware layer 210. The middleware layer 210 includes logic used to handle the message routing of the instant messaging application between the presentation layer and the service layer. The third layer is the service layer 215. The service layer 215 handles both the applications management and communications management of the client. The service layer 215 communicates with the communications layer 220 on the universal server 130.

Preferably, there are three basic layers to the instant messaging service. The first layer is the communications manager (CCM) 220. The communications manager 220 manages the connections between the client communications manager 215 and the universal server 130. In one embodiment, among others, of the universal server 130, communications between the client service layer 215 and the universal server 130 communications manager 220 occur in extensible markup language (XML). Further, the communications may be secure socket layer (SSL) encrypted for security. Moreover, the communications can be compressed by a compression/decompression algorithm implemented on a compression-decompression module, more commonly referred to as a CODEC, to provide faster data transfer.

The communications manager 220 includes a number of connection sockets between the communications manager 220 and a plurality of users. The communications manager 220 can further include a load balancer (not shown) to balance the connections over a number of different communications managers. The load balancer can maintain a connection to the same connection socket during the period while the user is logged on and connected to an operable communications manager 220, and can automatically connect the user to an alternate connection socket when a communications manager might fail. Thus, a continuous connection can be maintained during an active session despite hardware failures. The load balancer can also protect the server against denial of service attacks, which have become increasingly prevalent on the internet.

A standard communications manager 220 will typically attempt to recover and reallocate a connection socket after a period of time with no activity from the client 200. In this situation the communications manager 220 assumes that the client is no longer present on the system. However, because presence is an important piece of the instant messaging architecture, the communications layer 215 on the client-side sends a signal to the universal server 130 to keep the connection socket active on the communications manager 220.

The second layer is the service router 225, with one example known as a JabberD in the Jabber architecture, such as that available from Jabber, Inc. of Denver, Colo., which performs a similar function to the message router 210 on the client side of the network. A number of different service managers 230 can be coupled to the service router 225, each of which can provide a different service to the client 200 over the internet. Thus when a service is requested, the service router 225 routes the request to the requested service manager 230. In the instant messaging architecture the service manager 230 is a Jabber service manager (JSM) which allows text communication between parties. The JSM 230 also keeps track of presence and roster information 235, 240, respectively, for a particular user on the network who has logged into the instant messaging system. Presence 235 typically refers to the user's status on the network, while roster 240 typically refers to the status on the network of those on the user's resource list.

Similarly to the communications manager 220, the service router 225 can utilize a self-similar architecture using the CODEC (not shown) and load balancer (not shown) to optimize the connection between the communications manager 220 and the service router 225. Use of the CODEC enables high speed data transmission between the communications manager 220 and the service router 225. The load balancer provides a robustness that allows the client to maintain contact with a selected service manager 230 during a session.

In one embodiment, among others, of the universal server 130, the database containing the non-persistent data, such as presence and roster information 235, 240, can be severed from the service manager 230. The presence information 235 typically includes a list of all users who are registered with the universal server 130, while the roster list includes a non-persistent list of those resource which are present on the network. Thus, the non-persistent data can be maintained and updated at a single database, and the plurality of service routers 225 can connect to the same presence information 235. After severing this database from the service manager 230 the service manager 230 can be equipped, as described above, with a CODEC (not shown) and load balancer (not shown), again utilizing a self-similar architecture to provide quality of service and communication efficiencies.

The service router 225 is further coupled, in one embodiment, among others, to an XML database (XDB) library 245. The XDB library 245 is used as a translator such that the service router 225 can communicate with a database layer 250 that includes persistent data relating to a plurality of clients. The database layer 250 which contains most of the persistent data for the services on the network, such as resource lists, preferences, etc. In one embodiment, among others, of the universal server 130 the database layer 250 can be an Oracle 9*i* database. The XDB library 245 can be further coupled to an authentication server, such as a username and password database 255. Thus a username and password can be required before the user is authenticated and allowed to access the database layer 250 for any profile information.

After registering with the database layer 250, the user is provided with a resource list. The client 200 can then contact the service manager 230 to find out which of the resources on the resource list is present and/or available on the network. Typically, presence refers to the registration state of a client 200. If a client 200 is logged-in to the network, the client 200 is present on the network. Typically, availability refers to the status of a user at the client computer. A user can be made unavailable by the network if there has been no activity on the client computer 200 for a period of time. Otherwise, a client 200 can be made unavailable by user choice, if the user does not wish to be disturbed. One skilled in the art will recognize that these are merely definitions of various states that can be defined according to any specific implementation of the presence and roster databases 235, 240. Furthermore, these databases 235, 240 that contain non-persistent information could keep track of any other states that might be defined by the specific implementation of the service manager 230.

Typically with respect to instant messaging systems, the resource list only comprises a list of other users for which the client 200 wishes to know the status. However, the resource list could include access to a plurality of applications, and there could be multiple service managers which include managers for the plurality of applications coupled to the service router 225. These service managers could provide access to a multitude of different applications and resources, such as Microsoft Word and/or Visio, provided by Microsoft Corp. of Redmond, Wash., and/or billing entry applications, etc. Moreover, the Jabber service manager 230 could keep track of the presence of these other applications and other resources on the network. For example, if a client wished to access an e-mail account from a remote location and the system was down, the Jabber service manager 230 could alert the user that the server was down. Thus the client 200 would not waste resources searching and waiting for email from a server that is off-line.

Thus, Jabber can be used similarly to an operating system. When a resource server 260 is present on the network, the resource(s) associated with that resource server can be displayed as an icon on the client computer display, and when a resource server is down, the resource(s) can be removed from the client computer 200 display. Thus, icons, for example, could appear and disappear from a client computer 200 display as they become present and available, and not present or unavailable. Selecting the icon while it is displayed will cause a routing request to be sent to the service router 225. Upon receiving the routing request, the service router 225 will determine the correct routing of the routing request and deliver the proper service to the client computer 200.

Figure 3:
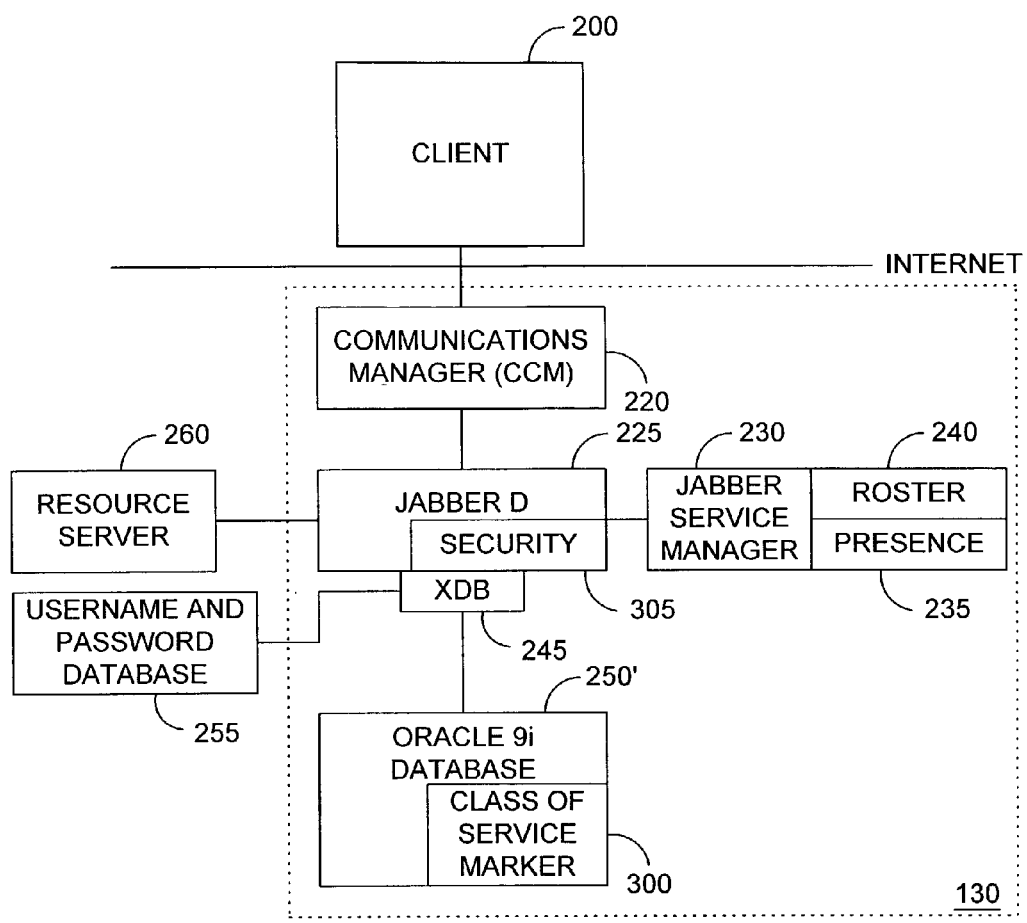
FIG. 3 is a block diagram of a network resource management system in one embodiment, among others, of the present invention.

Referring now to FIG. 3, in accordance with one aspect of the present invention, a network administrator may wish to limit access to a network resource. Access could be limited for a number of reasons, including scarcity of a particular resource such as licenses or bandwidth, non-payment of a debt, security, etc. In an embodiment of the universal server 130, (or in other embodiments, any server controlling resources for users) a class of service marker 300 can be included in a user profile and, preferably, used in conjunction with the presence information to either provide or deny access to any of a plurality of resources on a resource server 260. In various embodiments the plurality of resources could include other users, applications, service managers, connection sockets, or any other resource to which the network administrator might wish to limit access for whatever reason. Definitions of resources available for each class of service marker are also stored and referenced.

The class of service marker 300 is typically stored along with the persistent data in the database layer 250' of the universal server. In one embodiment, among others, the database layer 250' includes a class of service marker 300 in the packets sent to the client 200 upon receiving registration and authentication of the user. These packets, which are sent to the client 200 upon registration and authentication, also typically include the resource list information including contacts and contact groups set up by the user, and references to resources available to the user.

Upon receiving the resource list, the client 200 can send the service manager 230 a request for presence and roster information 235, 240 from the non-persistent database. This request can include the class of service marker in one embodiment, among others, of the present invention, as well as the users resource list, in some embodiments. The roster information 240 typically includes information about the presence and availability status of the resources on the user's resource list. Therefore each of the resources included on the client computer 200 display can further include information about the status of the resource. Typically, this information can be included by shading the icons corresponding to the status of the resource. A green icon can typically mean that the resource is present and available. A yellow icon can typically mean that the resource is present, but unavailable. A gray icon can typically mean that the resource is not present on the network. One skilled in the art will recognize that these states may be varied and that there exists myriad ways to display the status of the resource to the user on the client computer display, each of which is intended to be included within the scope of this invention.

The class of service marker 300 adds another layer to the presence schema, such that a resource, although the resource server 260 is physically present on the network, can appear not to be present to a particular user with an inadequate class of service marker 300. Thus, in one embodiment, among others, when the service manager 230 receives a request for status information from a client 200, the service manager 230 can also check the class of service marker 300. The service manager 230 can then update the status of those resources to which the user has access, while displaying as not present those resources to which the user's class of service marker 300 is inadequate. In some embodiments, resources for which the class of service marker is inadequate are not displayed at all, or in some embodiments, allowed to be on a user's resource list.

In an alternative embodiment, among others, a security layer 305 can be included within the service router 225. Any requests for a resource (including those possibly not on a user's resource list) would be accompanied by the class of service marker 300 associated with the user. The security layer 305 of the service router 225 would check the class of service marker 300 against a rule. The rule could be that a particular class of service level is only allowed access to certain resources. If the rule was satisfied by the user's class of service marker 300, the request would be routed. However, if the rule was not satisfied by the class of service marker 300, the service router 225 would refuse the resource request.

In a further alternative, among others, the service router 225 could be programmed to provide a prompt to the client 200 upon receiving an inadequate class of service marker 300. The prompt could include asking the user whether they would like to upgrade their class of service marker 300, or merely ask them if they would like to pay for the resource per use. If an affirmative answer is given, the service router 225 could record the transaction in the persistent database 250' or a separate billing database, and route the resource request.

Figure 4:
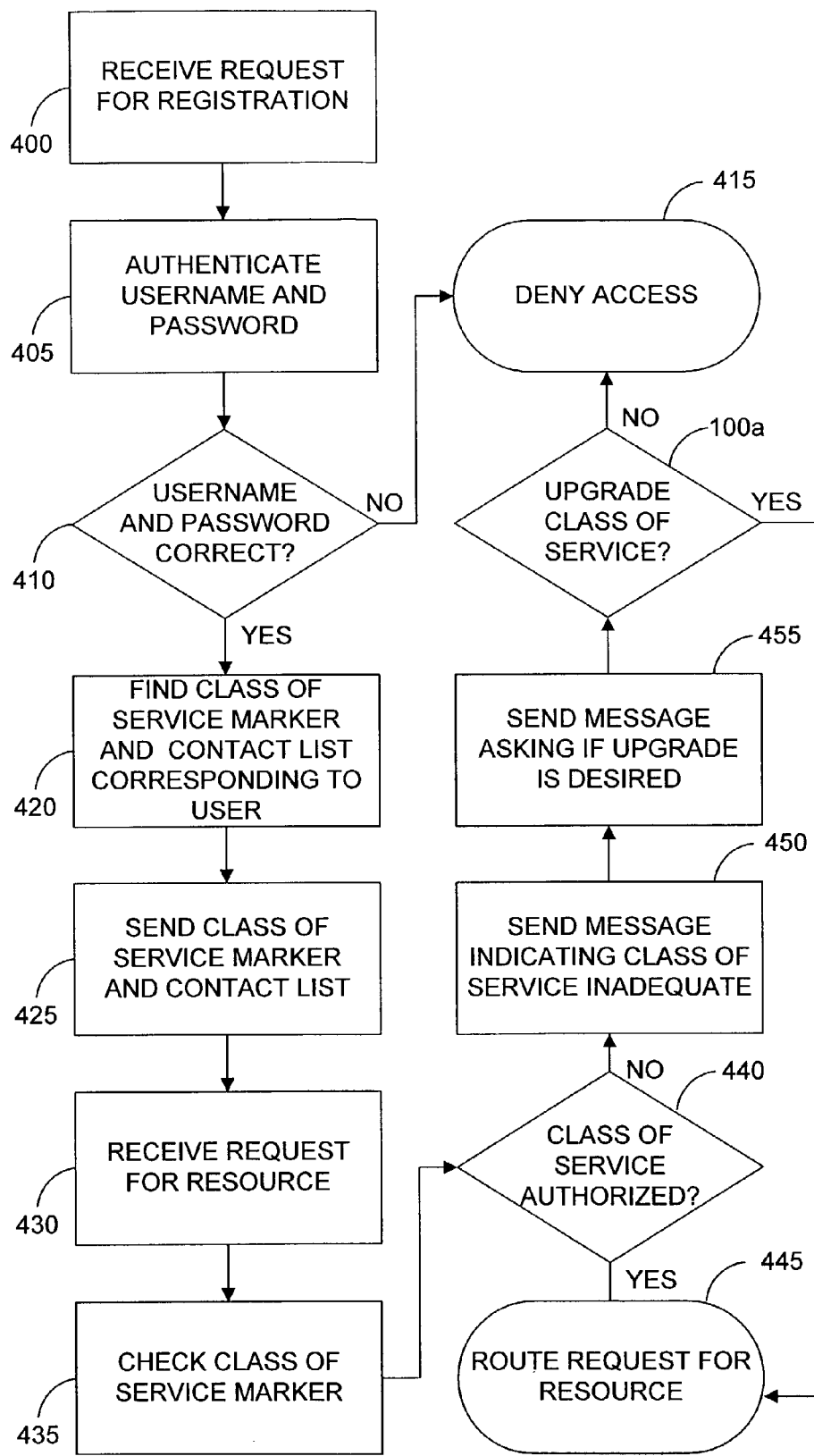
FIG. 4 is a flowchart illustrating one embodiment of the operation of the network resource management system of FIG. 3.

Referring now to FIG. 4, shown is a flowchart illustrating operation of the universal server of FIG. 3. In the first step 400, the universal server 130 receives a registration request. This step may be performed automatically on startup, or after starting the Jabber application. The universal server 130, the second step 405, will then ask for a username and password to authenticate the user. Typically the username will be a user's Jabber ID (JID), which can correspond to the user's e-mail address, and the password can be chosen by the user. After comparing the username and password received to its username and password database, the universal server 130 will either deny access, according to step 415, or will register the user and find a class of service marker 300 and resource list corresponding to the particular authenticated user, in accordance with step 420. In the next step 425, the universal server 130 sends the class of service marker 300 and resource list to the client 200. Once the client 200 has received the class of service marker 300 and resource list, the resource list can be displayed on the client computer 200 display.

In alternative embodiments, the client 200 can poll the Jabber service manager 230 to find out which of the resources on the user's resource list are present and available. The Jabber service manager 230 can further be configured to receive the class of service marker 300 from the client 200 and update the resource list displayed on the client computer 200 display according to which resources on the resource list are accessible to the client 200 according to the class of service marker 300.

In the next step 430, the universal server 130 receives a request from the client 200 for a resource to be routed to the client 200. The request is accompanied by a class of service marker 300, and the universal server 130 checks the class of service marker 300, at step 435, to ensure that the class of service is adequate to access the resource. At step 440, if the class of service marker 300 is authorized to access the requested resource, the resource is routed to the client, 445.

If the class of service is not authorized to access the resource a message can be sent to the client 200 indicating that the class of service marker 300 received is inadequate to access the requested resource, according to step 450. In alternative embodiments, this step 450 could be a termination for the exchange, however, in this particular embodiment the universal server 130 sends a message, in accordance with step 455, asking if the user would like to upgrade the class of service, for example, by paying extra money. In the next step 460, the universal server 130 receives an answer from the user. If the user agrees to upgrade their class of service, the client 200 receives a new class of service marker 300 and the service is routed to the client 200, in accordance with step 445. However, if the client 200 does not choose to upgrade the class of service, the client 200 is simply denied access to the resource, according to step 415. In this embodiment, the class of service marker 300 is used as a subscription level, however, in other embodiments the class of service marker 300 may be used as a security mechanism, such as to limit an employees access to resources, which cannot be upgraded merely according to the user's desire.

Moreover, in other alternative embodiments the resource server 260 has the option of checking the persistent database 250' to assure that the class of service marker 300 of the user matches the class of service marker 300 that was received from the client computer 200. This works as a security mechanism to help prevent a user from requesting the class of service marker 300 and then altering the class of service marker 300 to indicate that the client 200 has access to all network resources. In this way, each resource server 260 can be set up to double check the class of service marker to provide extra security.

In an alternative embodiment, among others, a security mechanism may be provided whereby upon checking a class of service marker 300 out of the persistent database 250', the class of service marker 300 may be issued with a security string attached. This security string can provide authentication to the universal server 130 when provided with the class of service marker 300. The security string can change day-to-day, or can change every time the user logs onto the universal server 130. Such a security string could be generated from a pretty good privacy (PGP) system wherein the universal system could use a public key to encrypt a password, and retain the private key, such that the password cannot be decrypted by a user and spoofed with another class of service marker 300 using the public key.

Figure 5:
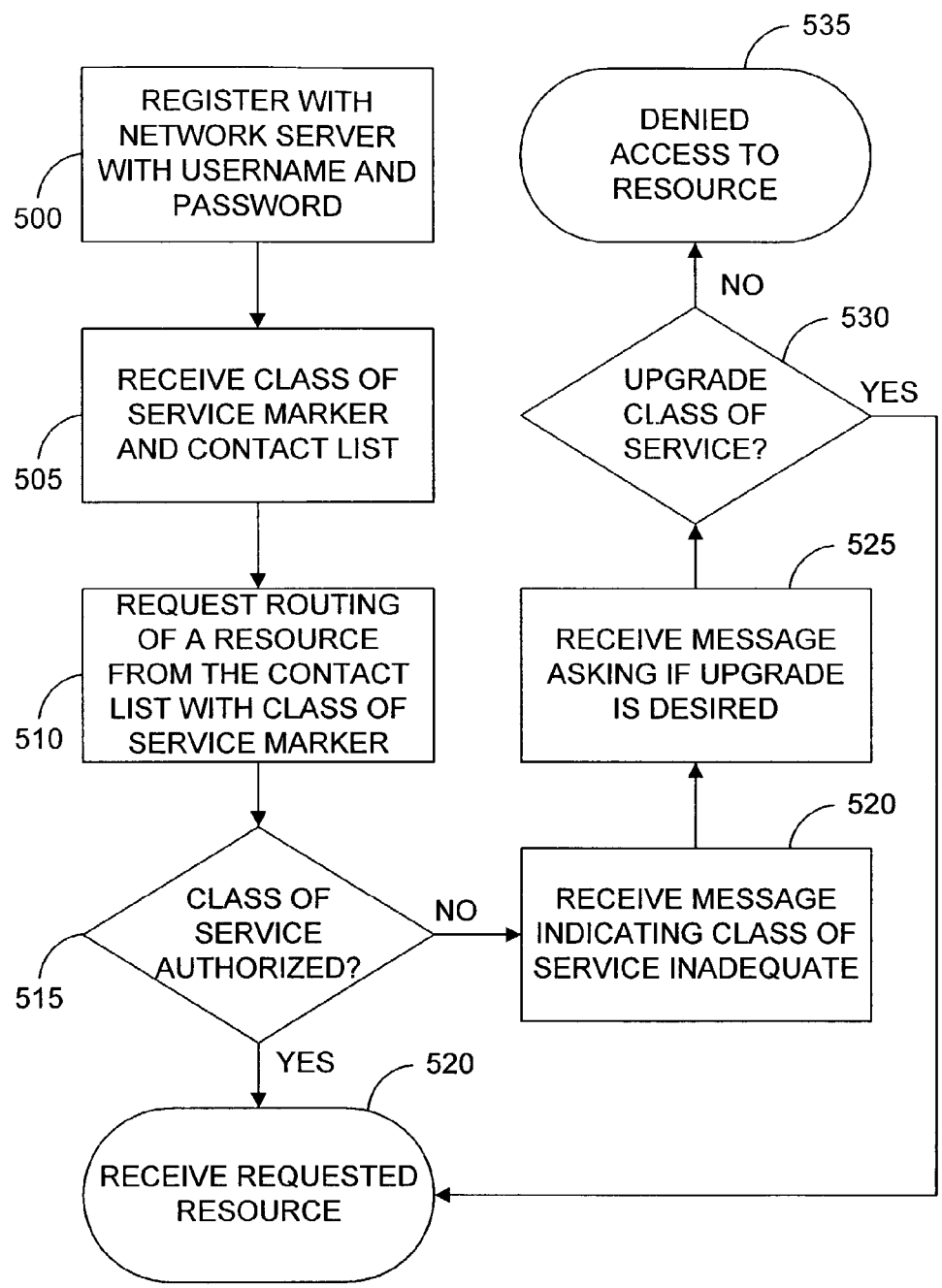
FIG. 5 is a flowchart illustrating one embodiment of the operation of the client of FIG. 3.

Referring now to FIG. 5, shown is a flowchart illustrating the operation of the client computer 200. In the first step 500, the client 200 registers with the universal server 130 by providing a username and password. Once the client 200 has provided a correct username and password, the next step 505 has the client 200 receiving a resource list from the universal server 130. The resource list can include an updated status on each of the resources included in the resource list. However, in alternative embodiments the client 200 uses the resource list to request status from the Jabber service manager 230. The status request can include the class of service marker 300 assigned to the client 200, such that the Jabber service manager 230 can provide correct status for those applications not accessible to the class of service to which the user belongs, even though they may be present and available.

In the next step 510, the client 200 requests routing of a resource to the client computer 200, including the class of service marker 300 with the routing request. The universal server 130 will receive the routing request and examiner the class of service marker 300 against a policy to ensure that the class of service marker 300 is adequate before routing the requested resource. If the class of service-marker 300 is authorized, in the next step 515 the client 200 will receive routing of the requested resource.

If the class of service marker 300 is inadequate to route the resource, in the next step 520 the client 200 will receive a message indicating that the requested resource cannot be routed due to an inadequate class of service marker 300. The client 200 may then receive a prompt querying the user to upgrade the user's class of service, in accordance with the next step 525. The user may then choose to either upgrade the class of service marker 300 or not in the next step 530. If the class of service marker 300 is upgraded, the requested resource is routed and received by the client 200 according to step 520. However, if the class of service is not upgraded by the user, in the next step 535 the client 200 is denied access to the resource.

Figure 6:
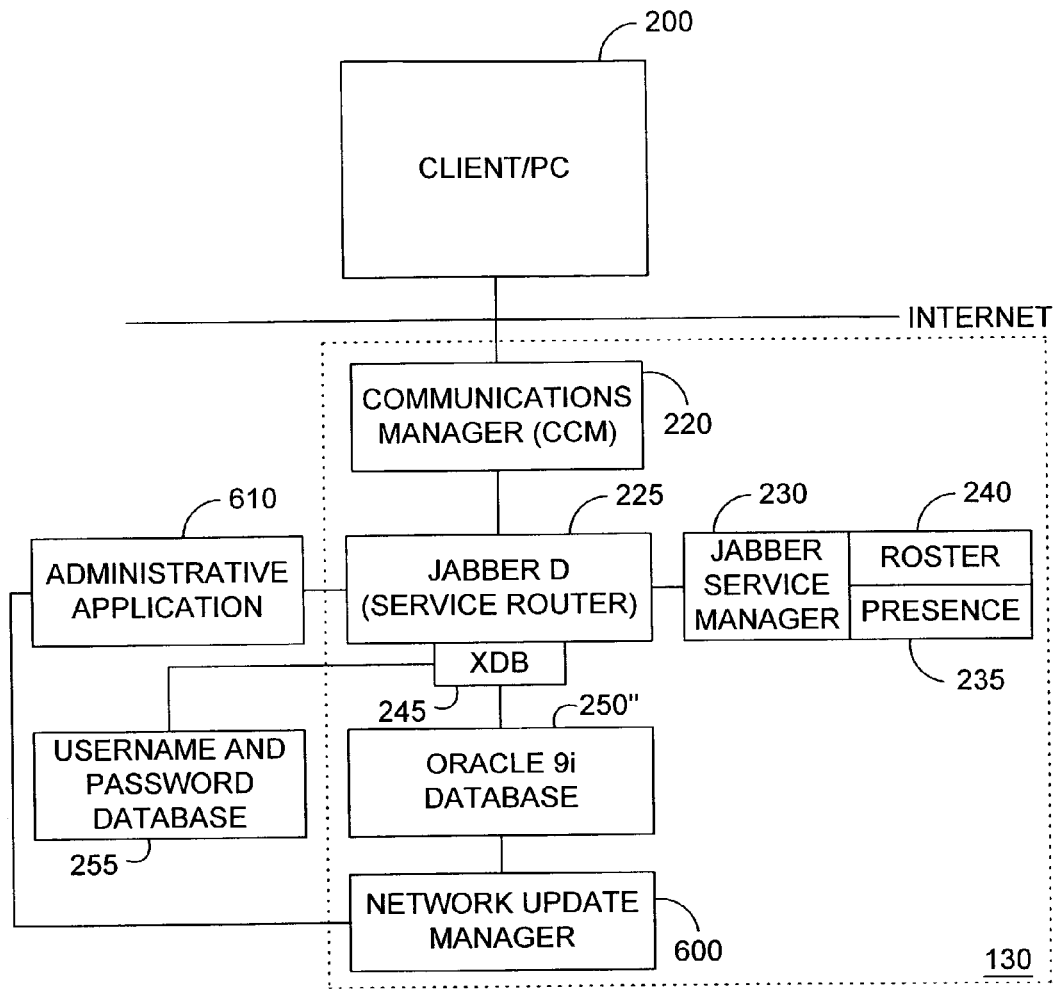
FIG. 6 is a block diagram of a network resource management system of FIG. 3 including a network update manager of one embodiment, among others, of the present invention.

Referring now to FIG. 6, shown is a network update manager 600 that can be included in one embodiment, among others, of the present invention. The universal server 130 can be equipped with a network update manager 600 that receives update commands from an administrative application 610 and automatically updates a persistent database 250", in one embodiment, among others, upon non-presence of the user associated with an update.

Typically, updating a database 250" that has a plurality clients using the database 250" requires either taking the database 250" down from the network or updating each profile when the user belonging to that profile is not present on the network (off-line). If these methods are not used, the database administrator risks crashing the database 250", client computers 200, or resources, because the database 250" and resources are in constant use by a plurality of clients. However, taking the database 250" off of the network requires making the database 250" inaccessible for a period of time. Moreover, updating each profile requires using the resources of the administrative application tool 610 to wait for each client to log-off of the database before his or her individual profile can be updated. Both of these methods waste system resources to update user profiles. Further, it should be recognized by one skilled in the art that multiple administrative applications can be connected to the service router 225. Multiple administrative applications 610 create a de-centralized updating system. In a de-centralized updating system it could be possible to have multiple updates from different administrative applications 610.

Instead of these methods, a network update manager 600 can be included which stores the updates until the persistent database 250" is ready to receive the updates. The network update manager 600 will wait to apply the changes to the database 250" until the changes can be applied without creating problems in the system. In other words, in one embodiment, the network update manager 600 checks for presence of a user associated with the update, and updates the profile of the user if the user is not present. Otherwise, the network update manager 600 periodically checks the presence of the user associated with the update until the user is not present, during which time the network update manager 600 stores the update in memory (not shown). Upon finding that the user is not present, the network update manager updates the user profile with the updated profile information from the administrative application 610. In this way, the administrative application 610 can remain running using full resources, and the database 250" can remain operational while the changes are in the process of being applied to the persistent database 250".

One skilled in the art will recognize that a situation may occur where a user attempts to retrieve information from the persistent database 250" before the records have been applied to the database 250". In this situation the service router 225 can be set up to check with the network update manager 600 before returning the stored profile to the user. Thus, when a database administrator wishes to change the user's profile, the change can be made effective on the client-side 200 while the change has not actually been enacted on the server-side 130.

In an alternative embodiment, among others, of the present invention the network update manager 600 can act as another type of proxy for the administrative application. In such embodiments, the network update manager 600 receives updates from the administrative application 610, and queues the updates until the persistent database 250" requests an update for a particular user. This request from the persistent database 250" can be triggered periodically, according to which users are not present on the universal server 130. Alternatively, the request from the persistent database 250" can be triggered every time a user logs on to the database 250". Of course, other triggering mechanisms are also included within the scope of the present invention.

With regard to the de-centralization created by multiple administrative applications, the network update manager can create a centralized updating system. In the centralized update system all updates are received and managed by the network update manager 600. Multiple updates can overwrite each other, the latest update taking priority over prior updates. Alternatively, the network update manager 600 can store all the updates and let the persistent database 250" sort the updates. It should be recognized that, in accordance with one embodiment, among others, of the present invention, the update information received from the administrative application 610 can further include a date/time stamp, which can indicate to either the network update manager 600 or the persistent database 250" which update takes precedence.

Figure 7:
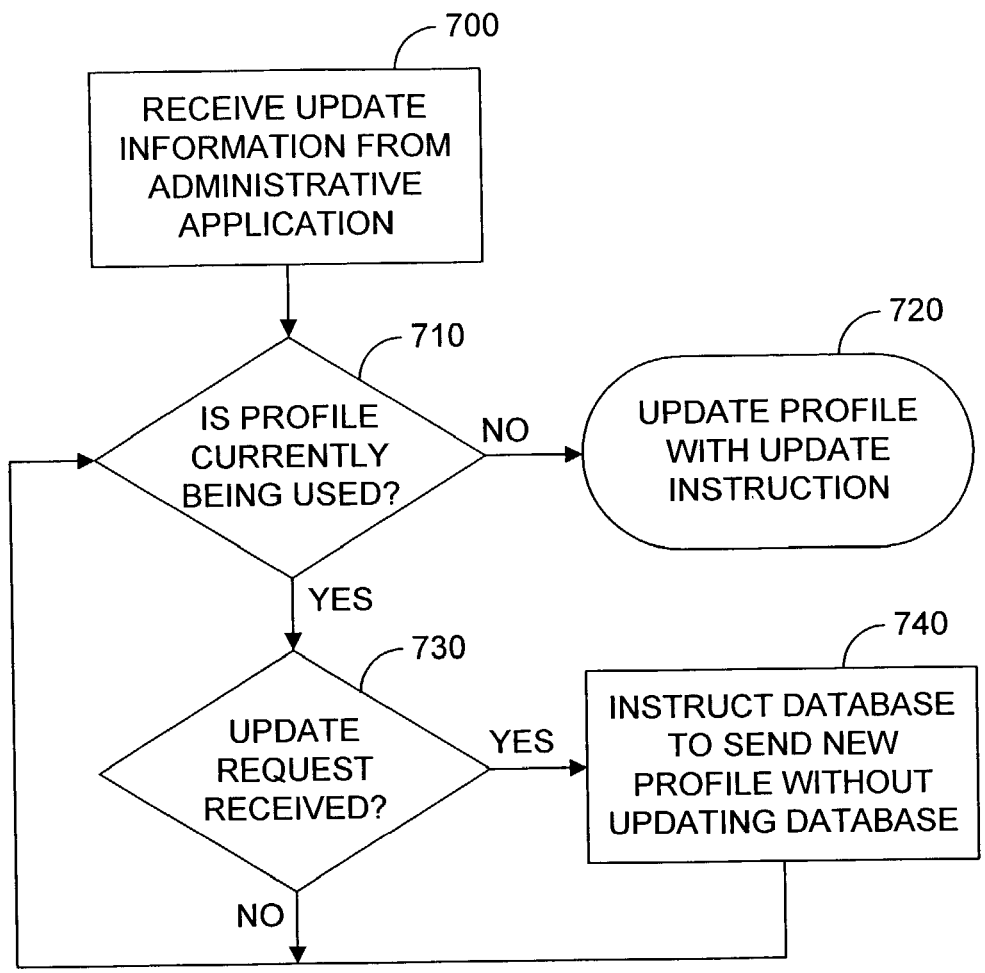
FIG. 7 is a flowchart illustrating one embodiment of the operation of the network update manager of FIG. 6.

Referring now to FIG. 7, shown is a flowchart illustrating an embodiment, among others, of the operation of the network update manager 600 of FIG. 6. In the first step 700, the network update manager 600 receives an update request from an administrative application 610. In the next step 710, the network update manager 600 then determines whether the profile to which the update should be applied is currently being used. If the profile is not being used, the network update manager 600 sends the change to the database 250", in accordance with step 720.

If the profile is being used, the update is not yet made, and the network update manager 600 checks for any profile requests, according to step 730. If there has been an update request, in step 740, the network update manager 600 instructs the database 250" to send the new profile as entered by the administrative application 610. Then the network update manager 600 checks whether there are still any clients 200 using the older profile, according to step 710. If there are no users using the old profile, the update can be applied, according to step 720, to the database 720. However, if there are still clients 200 using the old profile the network update manager 600 reiterates the process until there are no more clients 200 using the old profile and the update can be applied to the database 250.

Figure 8:
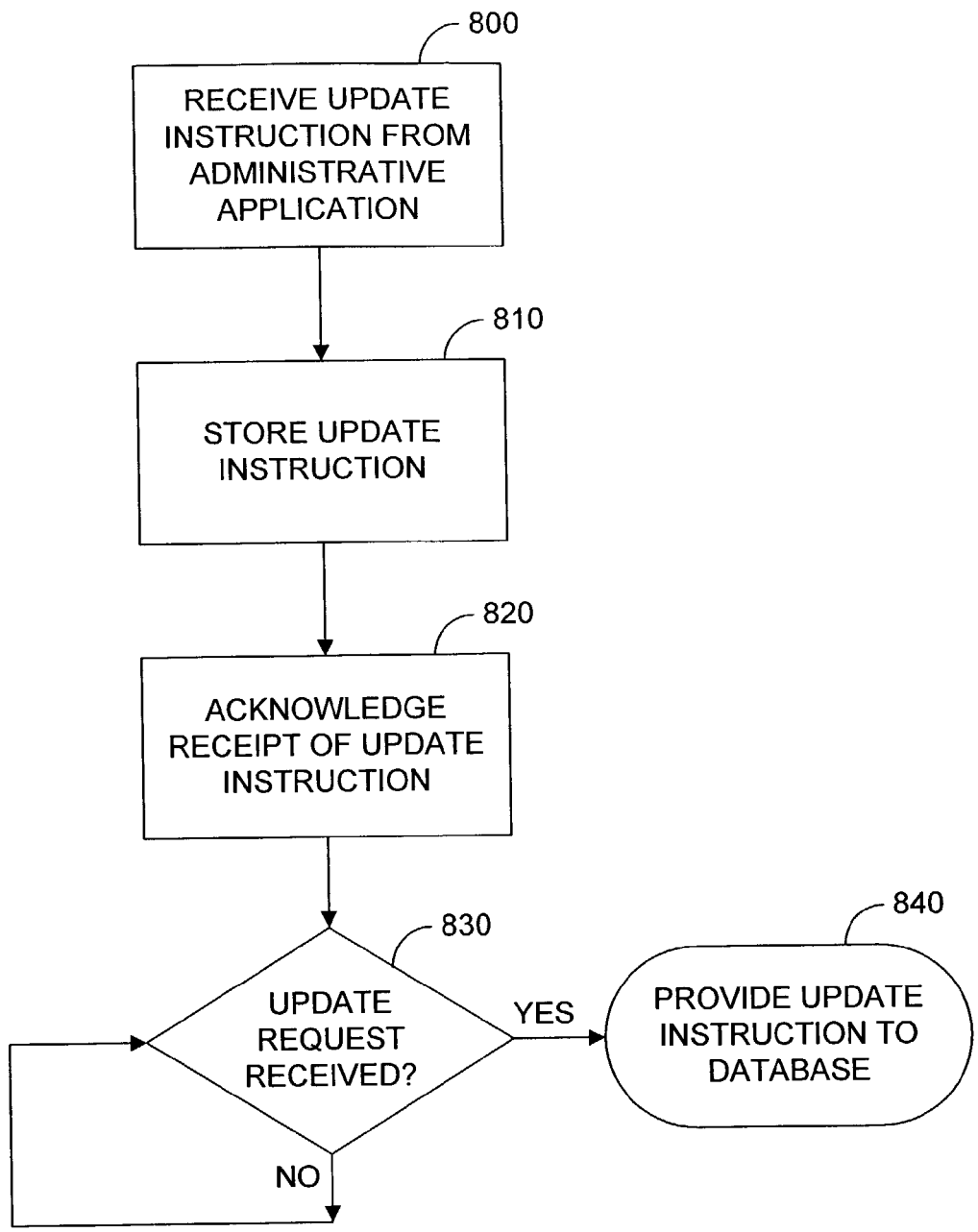
FIG. 8 is a flowchart illustrating an alternative embodiment, among others, of the operation of the network update manager of FIG. 6.

Referring now to FIG. 8, shown is a flowchart illustrating an alternative embodiment, among others, of the network update manager of FIG. 6. In step 800, the network update manager 600 receives an update instruction (or instructions) from the administrative application 610. The network update manager 600 stores the update instruction, in accordance with step 810. In step 820, the network update manager 600 sends an acknowledgement of receipt of the update information to the administrative application 610, which can be interpreted by the administrative application that the instruction will be enacted. The network update manager 600 then waits until an update request is received from the persistent database 250" corresponding to the user with whom the update information is associated with, in accordance with step 830. Upon receiving the update request, the network update manager 600 provides the update information to the persistent database 250", in step 840. The update request may simply be any identification of a user and may occur every time a user is authenticated upon log-in.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A network update manager, comprising:

an updater coupled to a persistent database and to a plurality of administrative applications residing on an at least one application server, the persistent database storing resource lists and associated class of service markers of users of a network that are modifiable by a network administrator via the plurality of administrative applications, a resource list including contacts and contact groups of a user and references to resources available to the user;

a means for monitoring the status of at least one user associated with at least one update;

a memory operable to store a plurality of delayed updates; and the network update manager being operable to receive at least one update from the plurality of administrative applications and either update the persistent database through the updater or store the at least one update in memory, in response to a network presence status of a user associated with an update, wherein:

the network presence status of any user is determined according to whether a remote terminal associated with the user has registered on the network;

the network update manager sends an undate to be stored in the memory when the specific user associated with a specific update is present on the network;

the network update manager updates a record in the persistent database in response to the network presence status of a specific user associated with a specific update;

the network update manager updates the record if the specific user associated with the specific update is not present on the network;

the network update manager monitors the status of the specific user, waiting for the network presence status to become not present, and retrieves the update from memory and updates the persistent database in response to the network presence status change;

the network update manager is coupled to the persistent database, and operable to monitor a status of at least one user associated with at least one update and report the status to the updater;

monitoring the status of at least one user comprises a check of the status of the at least one user at least once per twenty-four hour period;

the network update manager is operable to receive and reply to an update status request from the persistent database, the update status request comprising a username;

the network update manager is operable to search the memory for a delayed update associated with the username, and provide the delayed update to the persistent database upon finding an update associated with the username;

the network update manager checks the memory for the delayed update when a user registers with the persistent database;

the at least one update comprises updating at least one class of service marker associated with the at least one user; and the record in the persistent database comprises a list of users for which another user communicates over an instant messaging network and at least one network resource that the another user is authorized to access, network statuses of the users and the at least one network resource being provided to the another user via an instant messaging client, the network update manager performing an update of the record when the another user is not present on the network, the update being from the administrative application.

2. The network update manager of claim 1, wherein the class of service marker provides a basis for a resource server to refuse access to a resource when the user has an inadequate class of service marker.

3. The network update manager of claim 1, wherein authentication comprises providing a username and password.

4. A class of service management system, comprising:

a router coupled to a network and operable to authenticate and register a plurality of users with a presence database;

a persistent database coupled to the router and operable to provide a resource list and a class of service marker to the plurality of registered users, the persistent database storing resource lists and associated class of service markers of users of a network that are modifiable by a network administrator via the plurality of administrative applications, a resource list including contacts and contact groups of a user and references to resources available to the user;

a means for monitoring the status of at least one user associated with at least one update; and a network update manager coupled to the persistent database and to a plurality of administrative applications that initiate updates to resource list and class of service marker information for a plurality of users, and operable to receive updates from an administrator through at least one of the administrative applications and apply the updates to a persistent database, the persistent database storing resource lists and associated class of service markers of users of a network that are modifiable by the administrator via the plurality of administrative applications, a resource list including contacts and contact groups of a user and references to resources available to the user; wherein the network update manager updates a record in the persistent database in response to a network presence status of a specific user if the specific user associated with the specific update is not present on the network, wherein the network update manager comprises:

an updater coupled to the persistent database and to the plurality of administrative applications residing on at least one application server;

a memory operable to store a plurality of delayed updates; and the network update manager being operable to receive at least one update from at least one of the administrative applications, updating the persistent database, or storing the at least one update in response to a network presence status of a user associated with an update, the network presence status of any user is determined according to whether a remote terminal associated with the user has registered on the network, wherein:

the network update manager stores an update in the memory when the specific user associated with a specific update is present on the network;

the updater monitors the status of the specific user, waiting for the network presence status to become not present, and retrieves the update from memory and updates the persistent database in response to the network presence status change;

wherein the network update manager is operable to monitor the status of at least one user associated with at least one update;

the network update manager is operable to receive and reply to an update status request from the persistent database, the update status request comprising a username;

the monitoring the status of at least one user comprises checking the status of the at least on user at least once over twenty-four hour period;

the network update manager is operable to search the memory for a delayed apdate associated with the username, and provide the delayed update to the persistent database upon finding an update associated with the username;

the network update manager checks the memory for the delayed update when a user register with the persistent database;

the at least one update comprises updating at least one class of service marker associated with the at least one user; and the record in the persistent database comprises a list of users for which another user communicates over an instant messaging network and at least one network resource that the another user is authorized to access, network statuses of the users and the at least one network resource being provided to the another user via an instant messaging client, the network update manager performing an update of the record when the another user is not present on the network, the update being from the administrative application.

5. The network update manager of claim 4, wherein the class of service marker allows a resource server to refuse access to a resource when the user has an inadequate class of service marker.

6. The class of service management system of claim 4, wherein the persistent database is operable to send an update status request to the network update manager upon receiving a profile request from a user associated with the profile.

7. The class of service management system of claim 6, wherein the network update manager is operable to update the persistent database upon receiving the update status request from the persistent database.

8. A update management system, comprising:
an administrative application without a connection to a sewer, and operable to receive at least one update from a network administrator; and
a network update manager being coupled to the server and coupled to the administrative application, and operable to receive at least one update from the administrative application and update a database on the server based upon an availability status of the database, the server being operable to be coupled to at least one user through a network and provide services to the at least one user in response to information included in the database, wherein:
the database comprises at least one profile associated with the at least one user;
the database is operable to send an update status request to the network update manager upon receiving a profile request from the at least one user, requesting the at least one profile associated with the at least one user;
the profile comprises at least one class of service marker associated with the at least one user;
the network update manager is further operable to store the at least one update until the availability status of the database changes;

the network update manager is operable to check the availability of the database periodically until the database is available, applying the at least one update to the database upon a change in the availability status of the database;

the network update manager is coupled to the persistent database, and operable to monitor a status of at least one user associated with at least one update and report the status to the updater;

monitoring the status of at least one user comprises a check of the status of the at least one user at least once per twenty-four hour period;

the at least one update comprises updating at least one class of service marker associated with the at least one user; and the database of the server maintains records comprising a list of users for which another users communicates over an instant messaging network and at least one network resource that the another user is authorized to access, network statuses of the users and the at least one network resource being provided to the another user via an instant messaging client the network update manager performing an update of the record when the another user is not present on the network, the update received from the administrative application.

9. The system of claim 8, wherein the database further comprises at least one rule associated with the at least one class of service marker.

10. A method for managing network updates, comprising:
receiving an update to be applied to a plurality of records of a plurality of users, a record including a list of resources that are accessible to the user if the resources are presently available on a network, presence status of the resources being monitored by the user via a client application;
checking whether a profile associated with at least part of the update in a persistent database is currently being used, the persistent database storing resource lists and associated class of service markers of users of a network that are modifiable by a network administrator via the plurality of administrative applications, a resource list including contacts and contact groups of a user and references to resources available to the user;
updating the persistent database in response to the profile being unused;
receiving a request for update status for a user associated with the profile when the user register with the presence database;
delaying at least part of the update to the persistent database in response to the profile being used;
storing a delayed update in memory;
checking the memory for a delayed update associated with the user;
monitoring a status of a user associated with a delayed update, wherein:
checking whether the profile is being used comprises checking whether a user associated with the profile is registered with the presence database;
monitoring the status of a user comprises checking the status of a user at least once per twenty-four hour period;
the update comprises changing a plurality of class of service markers associated with a plurality of users, respectively;
at least one of the plurality of records comprising a list of users for which another user communicates over an instant messaging network and at least one network resource that the another user is authorized to access, network statuses of the users and the at least one network resource being provided to the another user via an instant messaging client, an update of the record being performed when the another user is not present on the network.

11. The method of claim 10, further comprising:
updating the persistent database after the profile becomes unused.

12. The method of claim 10, wherein the update comprises changes to a plurality of profiles.

13. The method of claim 10, further comprising:
updating the persistent database after the user ceases to be registered with the presence database.

14. The method of claim 10, further comprising:
updating the persistent database upon receiving an update status request from the persistent database.

15. A method of updating user data, comprising:
receiving a plurality of update instructions to update data related to a user, the update instruction to be applied to a record of the user maintained in a persistent, database, the record including a list of resources that are accessible to the user if the resources are presently available on a network and associated class of service marker of the user that are modifiable by a network administrator, presence status of the resources being monitored by the user via a client application;
storing the plurality of update instructions;
in response to the user not being present on a network, receiving a request for any update instructions corresponding to the user;
responsive to receiving the request, providing the plurality of stored update instructions;
removing an earlier update instruction in favor of a later update instruction; and
updating the record of the user in accordance with one or more update instructions, wherein:
the update instruction is received from one of multiple applications;
receiving happens in response to a user registering with a presence database;
the update comprises changing a plurality of class of service markers associated with a plurality of users, respectively;
the record comprises a list of users for which another user communicates over an instant messaging network and at least one network resource that the another user is authorized to access, network statuses of the users and the at least one network resource being provided to the another user via an instant messaging client, an update of the record being performed when the another user is not present on the network.

16. The method of claim 15, further comprising:
acknowledging receipt of an update instruction.

17. The method of claim 15, wherein providing includes transmitting to a database.

* * * * *